(12) United States Patent
Chang et al.

(10) Patent No.: US 7,134,182 B2
(45) Date of Patent: Nov. 14, 2006

(54) METHOD TO FORM AN EMBEDDED MICRO-PEDESTAL IN A CONDUCTIVE LAYER

(75) Inventors: Jei-Wei Chang, Cupertino, CA (US); Chao-Peng Chen, Fremont, CA (US); Youfeng Zheng, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 465 days.

(21) Appl. No.: 10/715,020

(22) Filed: Nov. 17, 2003

(65) Prior Publication Data

US 2005/0102820 A1    May 19, 2005

(51) Int. Cl.
*G11B 5/127* (2006.01)
*C23C 14/00* (2006.01)

(52) U.S. Cl. .............. 29/603.07; 29/603.02; 29/603.12; 29/603.14; 29/603.16; 29/846; 29/847; 29/831; 29/DIG. 16; 204/192.34

(58) Field of Classification Search ............ 29/603.07, 29/603.02, 603.12, 603.14, 846, 847, 831, 29/DIG. 16; 204/192.34, 192.32; 360/126, 360/317, 322, 320, 324.12; 216/22, 39, 48, 216/49

See application file for complete search history.

(56) References Cited

U.S. PATENT DOCUMENTS

| | | | | |
|---|---|---|---|---|
| 5,568,335 A | * | 10/1996 | Fontana et al. | 360/320 |
| 5,850,324 A | * | 12/1998 | Wu et al. | 360/322 |
| 5,991,125 A | * | 11/1999 | Iwasaki et al. | 360/324.12 |
| 6,157,525 A | * | 12/2000 | Iwasaki et al. | 360/324.12 |
| 6,419,845 B1 | | 7/2002 | Sasaki | 216/22 |
| 6,462,915 B1 | | 10/2002 | Sasaki | 360/317 |

* cited by examiner

*Primary Examiner*—A. Dexter Tugbang
*Assistant Examiner*—Tai Van Nguyen
(74) *Attorney, Agent, or Firm*—Saile Ackerman LLC; Stephen B. Ackerman

(57) ABSTRACT

Conventional liftoff processes used to define track width in magnetic read heads can produce an uneven etch-depth of dielectric materials around the sensor and cause shorting to the overlay top lead layer. This problem has been overcome by printing the images of track width and stripe height onto an intermediate layer to form a hard mask. Through this hard mask, the GMR stack can be selectively etched and then back-filled with a high-resistivity material by using newly developed electroless plating processes.

9 Claims, 5 Drawing Sheets

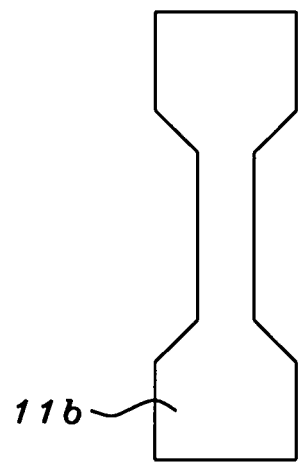
FIG. 1 – Prior Art
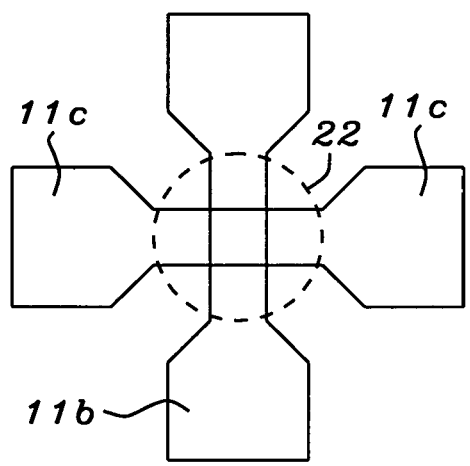
FIG. 2 – Prior Art
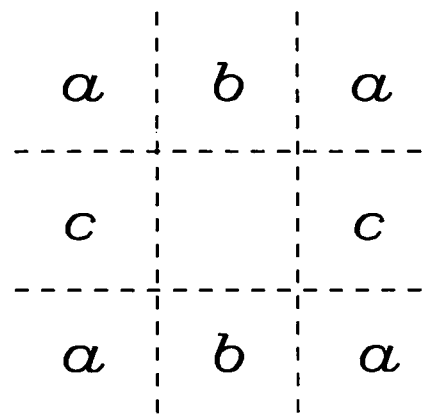
FIG. 3 – Prior Art

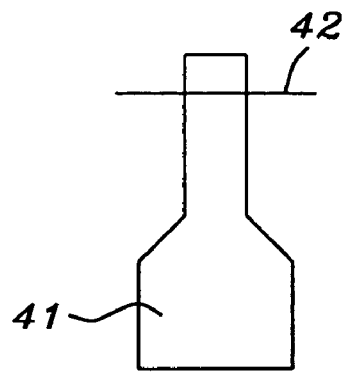
FIG. 4 – Prior Art
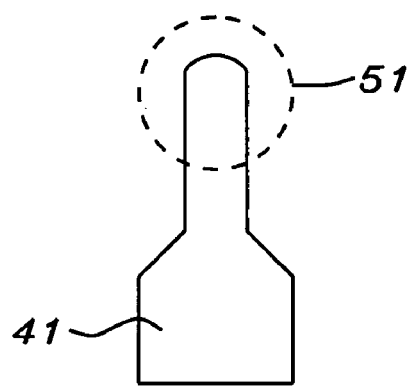
FIG. 5 – Prior Art
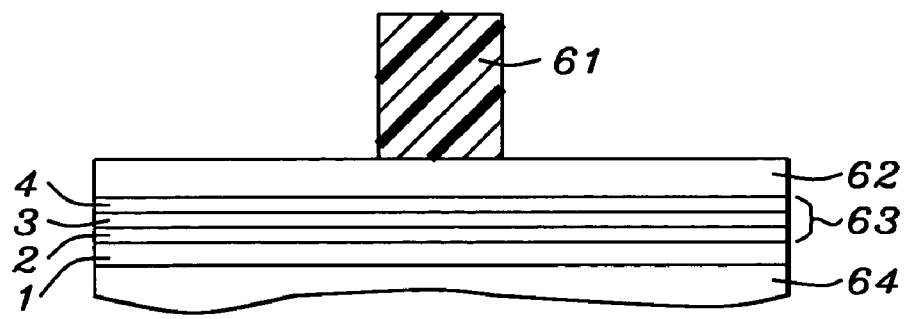
FIG. 6

METHOD TO FORM AN EMBEDDED MICRO-PEDESTAL IN A CONDUCTIVE LAYER

FIELD OF THE INVENTION

The invention relates to the general field of GMR read heads with particular reference to elimination of lift-off for the critical read-width defining step.

BACKGROUND OF THE INVENTION

Conventionally, track-width and back-edge definitions of GMR heads are fabricated in two separate steps. As illustrated in FIG. 1, track width 11b is formed first through a lithographic process, followed by ion beam etching, ion beam deposition of dielectric materials, and lift-off of photo resists. Back-edge is patterned next by following the similar processes with mask 11c across the track width, as shown in FIG. 2.

FIG. 3 is a schematic representation of the area contained within circle 22, As the CPP sensor size is shrunk to below 100 nm, this conventional two-step process becomes a challenge. As noted in the area of a, b, and c in FIG. 3, such a process can produce an uneven etch-depth of dielectric materials around the sensor and cause shorting to the overlay top lead layer. One way to overcome this problem is to combine the two-step process into one by using stencil mask 41 shown in FIG. 4, which extends beyond the final location of ABS (air bearing surface) 42. However, such modification can produce undesirable round back-edge corners 51 (as illustrated in FIG. 5). The present invention discloses an approach to resolving this problem.

In addition, conventional liftoff resist patterning procedures that employ dual-layer resists are very difficult to apply to the production of sub-100 nm resist features. The main problem lies in the very narrow process window available for undercut control. Undercut control using a thin release layer can result in liftoff difficulty. On the other hand, if the undercut is too large, it can cause collapse of the top image layer. The present invention discloses a process that eliminates the need for a liftoff mask for defining the most critical width of the structure.

A routine search of the prior art was performed with the following references of interest being found:

U.S. Pat. No. 6,462,915 (Sasaki) discloses electroless plating of a permalloy to form the bottom pole of a CPP device.n while U.S. Pat. No. 6,419,845 (Sasaki) shows a NiB plating layer.

SUMMARY OF THE INVENTION

It has been an object of at least one embodiment of the present invention to provide a process for manufacturing a CPP GMR read head Another object of at least one embodiment of the present invention has been is that the GMR pillar associated with said read head measure less than about 0.1 micron on a side.

Still another object of at least one embodiment of the present invention has been that current through said read head be constrained to flow almost entirely through the layers which determine the signal strength ($\Delta R/R$) of the device.

These objects have been achieved without using a conventional liftoff process for the critical track-width defining step. Instead, the images of track width and stripe height are lithographically printed onto an intermediate layer to form a hard mask. Through this hard mask, the GMR stack can be selectively etched and then back-filled with a high-resistivity material by using newly developed electroless plating processes. Since the hard mask is insulating, the electrolessly deposited material does not form on it. The process readily adapts to a second embodiment in which current is constrained to flow through only the desired layers.

BRIEF DESCRIPTION OF THE DRAWINGS

FIGS. 1–3 illustrate prior technology used to form a read head.

FIGS. 4–5 details some problems associated with the prior art.

FIG. 6 illustrates the first of several novel features of the present invention.

FIG. 9 illustrates an important feature of the present invention which is an embedding layer of high resistivity material that is electrolessly deposited.

DESCRIPTION OF THE PREFERRED EMBODIMENTS

Figure 7:
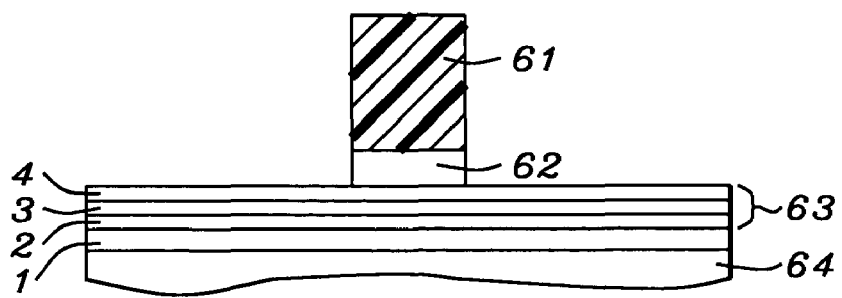
FIGS. 7–10 show how a CPP GMR pillar, measuring less than 0.1 microns on a side, can be formed according to the process of the present invention.

In this invention, we disclose a method to produce a sub-100 nm CPP-structure without using the dual-layer resist lift-off process. In this method, the images of track width and stripe height are lithographically printed onto an intermediate layer to form a hard mask. Through this hard mask, the GMR stack can be selectively etched and then refilled with a high-resistivity material by using newly developed electroless plating processes.

To illustrate these ideas, we now proceed to a detailed description of the process sequence. We will use manufacture of a CPP GMR read head as a vehicle for this purpose but it will be understood that the method is more general than this and may be used whenever a feature that measures less than 0.1 microns on a side is to be carved out of a given layer.

Referring now to FIG. 6, the process of the present invention begins with the provision of bottom conductor layer 64 onto which is deposited, in succession, pinning layer 1, pinned layer 2 (a single layer of soft magnetic material or a synthetic antiferromagnetic laminate), non-magnetic spacer layer 3, and free layer 4, thereby forming GMR stack 63.

This is followed by the deposition of sputter resistant insulating layer 62 on whose surface stripe-shaped photoresist mask 61 is formed (said stripe extending into and out of the plane of the figure and having a width between about 0.05 and 0.3 microns). Insulating layer 62 is a material such as alumina, silica, silicon nitride, or aluminum nitride and it is deposited to a thickness between about 150 and 1,000 Angstroms.

Figure 8:
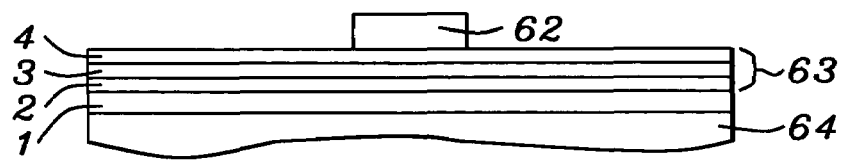
Figure 9:
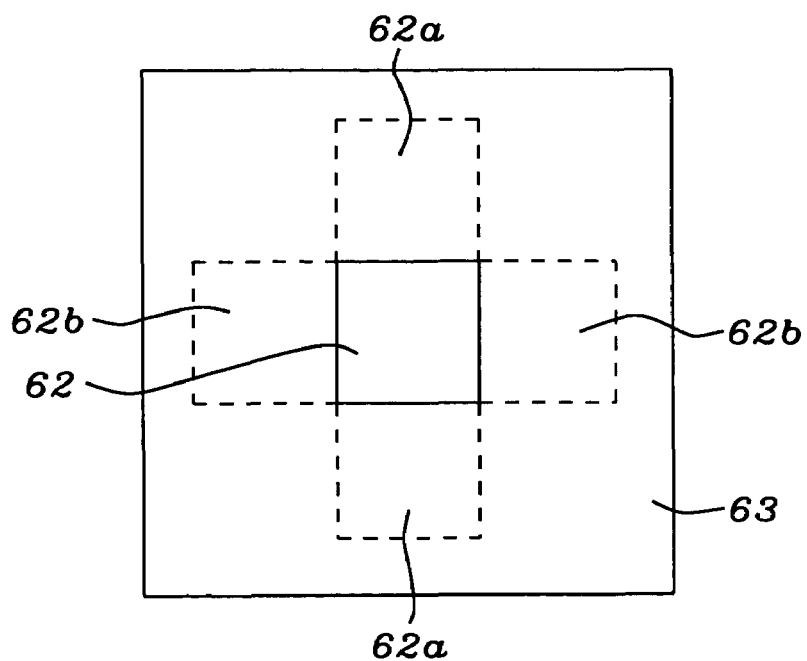

Then, as shown in FIG. 7 all of layer 62 not covered by mask 61 is removed. Then, when mask 61 is itself removed, layer 62 now becomes a hard mask of the same shape, as seen in FIG. 8. The process of etching layer 62 is now repeated with mask 61 now disposed to be orthogonal to its original orientation so that, at the conclusion of the second etching step, all that remains of hard mask 62 is the square (or rectangle if the two photoresist masks had different widths) seen in the plan view shown in FIG. 9. Also shown in FIG. 9, partly as broken lines, are the outlines of the two original photoresist masks.

Figure 10:
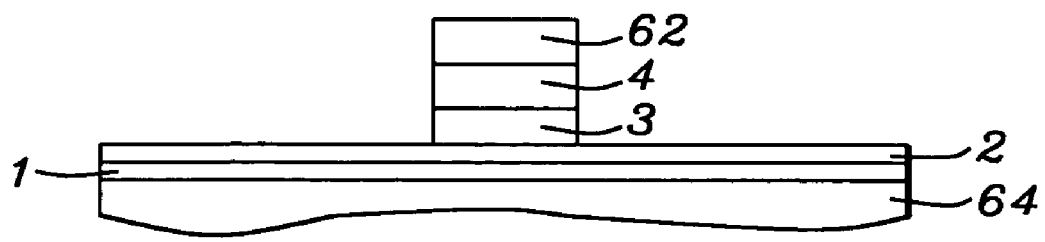

Once hard mask 62 has been formed, it is now possible to use ion milling to remove as much of the unprotected portions of layer 63 as desired. In a first embodiment, ion milling is stopped once non-magnetic spacer layer 3 has been exposed, thereby forming CPP GMR pillar 63 (whose height is typically between about 200 and 500 Angstroms), as shown in FIG. 10, following which hard mask 62 is selectively removed by using EDTA (pH 9.5–10.5, 50–60 g/l at 80° C.) for alumina and aluminum nitride and RIE ($CF_4$, $CCl_4$, $CHF_3$, or $CHCl_3$ gas) for silica or silicon nitride.

Figure 11:
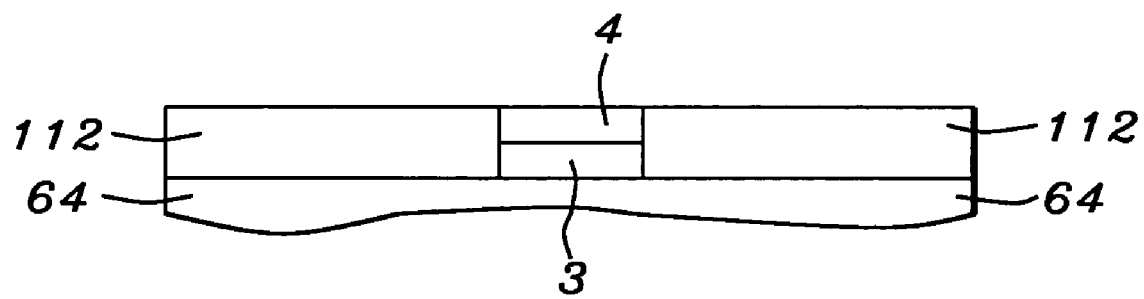

Next, as seen in FIG. 11, embedding layer 112, of a material, whose resistivity is between about 1 and 5 milliohm cm, is selectively deposited onto the exposed surface of spacer layer 3/lower conductive layer 64 as well as on the sidewalls of CPP GMR pillar 63 to a thickness that makes its top surface coplanar with the top surface of pillar 63. Suitable materials for this purpose include, but are not limited to) NiReBP, NiReP, and NiReB. This is achieved using an electroless deposition process that will not coat insulating surfaces, following which hard mask 62 is selectively removed.

As an example, a bath having the composition listed in TABLE 1 could be used at a temperature between about 50 and 90° C. to deposit a material such as NiReBP, NiReP, or NiReB at a rate of about 100 to 5,000 Angstroms per minute:

TABLE I

| Chemicals | Concentration (Moles/liter) |
|---|---|
| Nickel sulfate | 0.05 to 0.2 |
| Dimethylamine borane | 0.01 to 0.05 |
| Sodium hypophosphite | 0.01 to 0.05 |
| Sodium citrate | 0.1 to 0.5 |
| Ammonium perrhenate | 0 to 0.05 |
| Lead nitrate | 0 to 10 ppm |
| Bath temperature | 50 to 90° C. |
| Bath pH | 6 to 7 |

Once the structure of FIG. 11 has been formed, a conventional liftoff mask (not shown) is used to define areas 112a (see FIG. 12) that symmetrically extend outward from the edges of 63 for a distance large enough so that optical resolution of the liftoff mask is not a problem (typically between about 0.01 and 0.05 microns). The liftoff mask is then used for conventional subtractive etching so that all exposed portions of 112 are removed.

Figure 12:
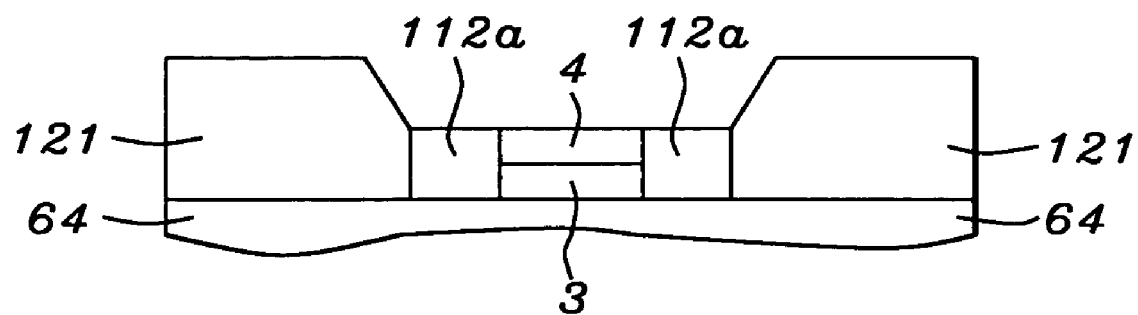
FIGS. 12–13 show the final steps used in a first embodiment of the invention.
Figure 13:
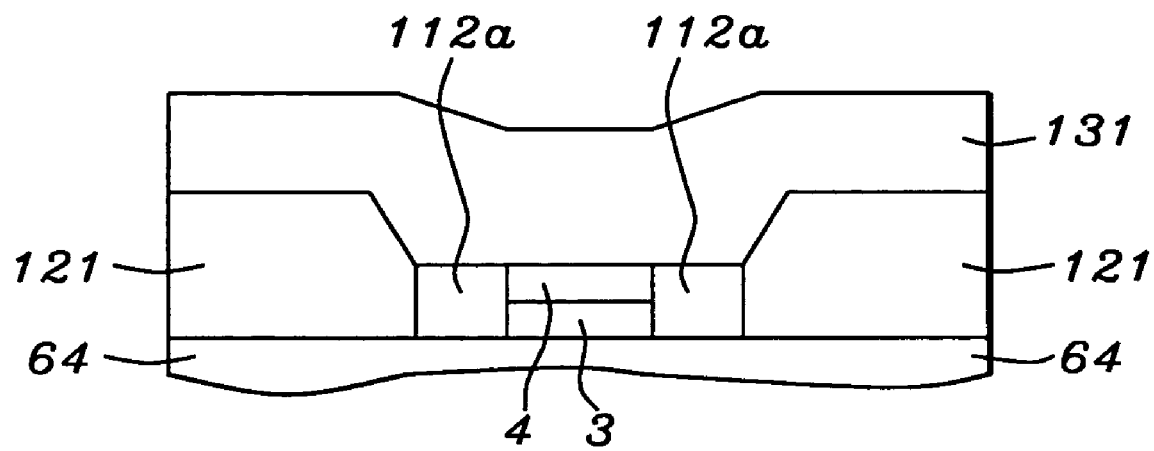

This is followed by the deposition of insulating layer 121 which is then lifted off, giving the structure the appearance shown in FIG. 12. Insulating layer 121 is a material such as NiReB, NiReP, or NiReBP and it is deposited to a thickness between about 200 and 500 microns. Manufacture of the read head device is then completed with the deposition of upper conductive layer 131, as shown in FIG. 13.

Figure 14:
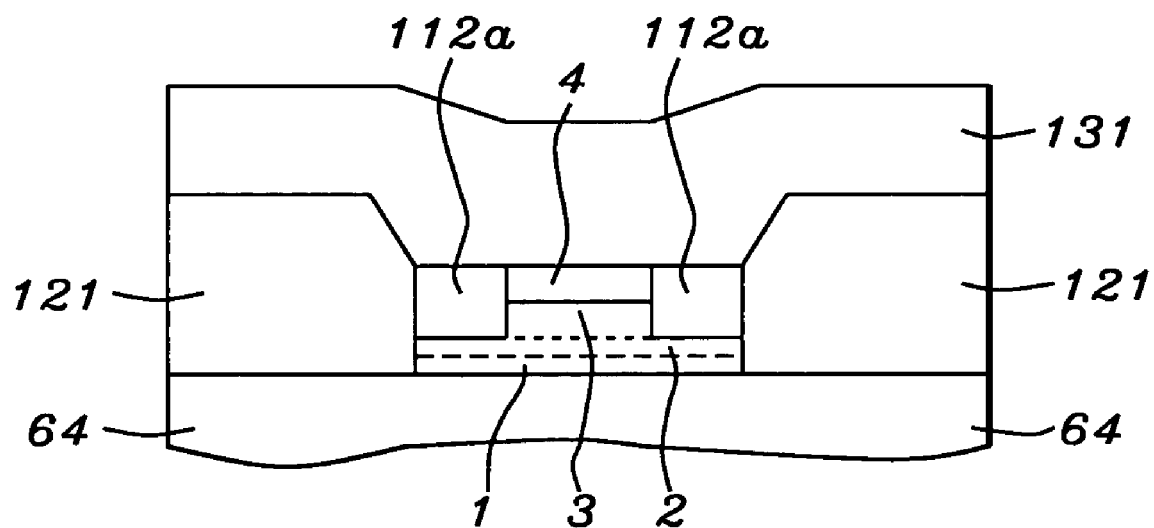
FIG. 14 shows the end product when using a second embodiment of the invention.

A second embodiment of the invention is illustrated in FIG. 14. It is similar to the just-described first embodiment except that etching of the CPP GMR layers is not terminated until pinning layer 1 has been exposed. The subtractive etching process, rather than ion milling is thus used to determine the area of layer 1, making this larger than that occupied by layers 2 and 4. This allows a larger current to pass from the lower conductive layer into the GMR stack, said larger current being then forced to flow almost entirely through layers 3 and 4 which are the ones that determine the signal strength ($\Delta R/R$) of the device.

Using known resistance values for regions 112 and 63 (in FIG. 14) the leakage (shunted) current through the embedding layer 112 is estimated to be less than 1%.

What is claimed is:

1. A method to form an embedded micro-pedestal in a conductive layer, having a first top surface, comprising:
   depositing on said top surface a layer of sputter resistant insulating material;
   forming a first stripe-shaped photoresist mask on said insulating layer and then etching all exposed portions of said insulating layer thereby forming a preliminary hard mask;
   removing said first photoresist mask and then forming, on said top surface and preliminary hard mask, a second stripe-shaped photoresist mask, that is orthogonally and symmetrically disposed relative to said preliminary hard mask, and then selectively etching all exposed portions of said insulating layer thereby forming a final hard mask;
   by means of ion milling, removing an amount of the layer wherever said first top surface is exposed, thereby forming said micro-pedestal and a second top surface;
   then, through electroless deposition, selectively depositing a layer of embedding material on said second top surface and on all sidewalls of said micro-pedestal; and
   removing said final hard mask.

2. The method described in claim 1 wherein said embedding material has a resistivity between about 1 and 5 milliohm cm.

3. The method described in claim 1 wherein said layer of insulating material is selected from the group consisting of alumina, silica, silicon nitride, and aluminum nitride.

4. The method described in claim 1 wherein said layer of insulating material is deposited to a thickness between about 150 and 1,000 Angstroms.

5. The method described in claim 1 wherein said first stripe-shaped mask has a width between about 0.05 and 0.3 microns.

6. The method described in claim 1 wherein said second stripe-shaped mask has a width between about 0.05 and 0.3 microns.

7. The method described in claim 1 wherein micro-pedestal has a height between about 200 and 500 Angstroms.

8. The method described in claim 1 wherein said embedding material is selected from the group consisting of NiReB, NiReP, and NiReBP.

9. The method described in claim 1 wherein the step of selectively depositing said layer of embedding material on said second top surface and on all sidewalls of said micro-pedestal further comprises using a solution containing nickel sulfate, 0.05 to 0.2 moles per liter, dimethylamine borane, 0.01 to 0.05 moles per liter, sodium hypophosphite, 0.01 to 0.05 moles per liter, sodium citrate, 0.1 to 0.5 moles per liter, ammonium perrhenate, up to 0.05 moles per liter, and lead nitrate, up to 10 ppm, at a bath temperature of 50 to 90° C. and a pH level of 6 to 7 for 1 to 6 seconds.

* * * * *